US010021114B1

(12) United States Patent
Liu et al.

(10) Patent No.: US 10,021,114 B1
(45) Date of Patent: Jul. 10, 2018

(54) DETERMINING THE LEGITIMACY OF MESSAGES USING A MESSAGE VERIFICATION PROCESS

(71) Applicant: Thumbtack, Inc., San Francisco, CA (US)

(72) Inventors: Zhenyu Liu, San Jose, CA (US); Jeffrey Lock, San Francisco, CA (US); Tracy Livengood, San Francisco, CA (US); Harsh Pankaj Panchal, Foster City, CA (US); De Li, San Francisco, CA (US); Benjamin Robert Anderson, San Francisco, CA (US); Jorge David Simosa, Redwood City, CA (US); Sumit Surendra Agarwal, San Francisco, CA (US)

(73) Assignee: THUMBTACK, INC., San Francisco, CA (US)

( * ) Notice: Subject to any disclaimer, the term of this patent is extended or adjusted under 35 U.S.C. 154(b) by 0 days.

(21) Appl. No.: 15/446,370

(22) Filed: Mar. 1, 2017

(51) Int. Cl.
    *G06F 17/30*     (2006.01)
    *H04L 29/06*     (2006.01)
    *H04L 12/58*     (2006.01)

(52) U.S. Cl.
    CPC .......... *H04L 63/123* (2013.01); *H04L 51/046* (2013.01); *H04L 63/101* (2013.01)

(58) Field of Classification Search
    CPC .... H04L 63/123; H04L 51/046; H04L 63/101
    See application file for complete search history.

(56) References Cited

U.S. PATENT DOCUMENTS

| 7,805,126 B2* | 9/2010 | Koskinen | H04L 12/14 379/126 |
| 2009/0080650 A1* | 3/2009 | Selgas | H04L 63/061 380/44 |
| 2015/0074802 A1* | 3/2015 | Sanjeev | G06F 21/55 726/22 |
| 2015/0295942 A1* | 10/2015 | Tao | H04L 63/1483 726/23 |

\* cited by examiner

*Primary Examiner* — Mohammed Waliullah
(74) *Attorney, Agent, or Firm* — Nicholson De Vos Webster & Elliott LLP (57) ABSTRACT

A server computer receives an indication of an interaction between a first user device of a first user and a second user device of a second user, where the interaction includes a message for transmission from the first user to the second user. The server computer performs a verification process on the message, including performing one or more binary checks on the message. The server computer then generates a response indicating whether the message is a legitimate message based on the verification process. When the response indicates that the message is a legitimate message, the server computer transmits the message to the second user device of the second user for display.

12 Claims, 3 Drawing Sheets

DETERMINING THE LEGITIMACY OF MESSAGES USING A MESSAGE VERIFICATION PROCESS

FIELD

Embodiments of the invention relate to the field of network communications, and more specifically, to performing a verification process on interactions between computing devices.

BACKGROUND

The ability to use communications networks, including the Internet, to generate and transmit messages between user devices, also provides a common vulnerability: the reception of fraudulent or spamming communications. In situations where messages are associated with a service provider, fraudulent messages or spam messages being received by users of the service provider can result in a negative impact to the service provider.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood, by one skilled in the art, that embodiments of the invention may be practiced without these specific details. In other instances, circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In an embodiment, a server computer performs a message verification process on messages sent between computing devices or user devices. In some embodiments, the server computer determines whether a message sent between two user devices is a legitimate message or is a non-legitimate message (e.g., spam, fraud). For example, the server computer may receive a message from a first user device for sending to a second user device. The server computer performs a verification process on the message using a predictive model. In some embodiments, the predictive model uses historical data of previous messages analyzed by the server computer, the results of previous verification processes on the previous messages, user-defined rules, and machine-learned rules. In some embodiments, the predictive model generates a likelihood value for the message, the likelihood value representing a probability of the message being a legitimate message.

In some embodiments, when a message has been verified as a legitimate message, the server computer determines whether the message was a request message from a first user, a response message from a second user in response to a previous request message from the first user, or a response message from the first user in response to a response message from the second user. When the message is determined to be a response message from the first user in response to a response message from the second user, the server computer accesses a user account of the second user. In such embodiments, the server computer modifies the user account of the second user. For example, the server computer modifies the user account of the second user by posting a charge against an account of the second user. In another example, the server computer modifies the user account of the second user by placing a notation within the user account that the first user responded to the response message from the second user.

Embodiments of the invention provide many technical advantages. For example, performing the message verification process on a message prior to transmitting the message to its intended destination saves bandwidth and other computing resources throughout a network by preventing the sending of data that have been identified as likely fraudulent or containing spam. In addition, by preventing the message from reaching its intended destination, computing resources of the destination user device are preserved as the destination user device does not have to process the fraudulent or spam message. For example, the destination user device does not have to dedicate resources to process or store messages that are fraudulent or spam. In some embodiments, detecting messages that are likely fraudulent or spam prior to the messages being sent to its intended destination, conserves bandwidth and resources by preventing the need to perform corrective actions when a delivered message is later determined to be fraudulent or spam, such as recalling messages or performing refunds.

Further, embodiments in which the message verification process is performed on the message concurrently with the message being sent to the its intended destination also provide benefits. For example, by performing the message verification at a server computer that can intercept, or otherwise receive messages on behalf of users, individual user devices do not have to modify their systems. The server computer is able to perform and maintain the message verification operations, including updating the predictive model in a manner that does not require interactions by the users or from the user devices. The message may be delivered to the recipient, but if the message verification process determines the message is fraudulent or spam, the message can be deleted without requiring the recipient to perform any steps. This also allows the server computer to act as a control point where detection thresholds can be adjusted or otherwise modified based on real-time operations and current vulnerabilities.

The predictive model can further allow the server computer to automatically detect patterns of fraudulent activity. This can allow the predictive model to determine that fraudulent activity is part of a coordinated attack. In addition, by verifying messages, the system also can determine whether messages are in compliance with Terms of Use restrictions.

Further, in some embodiments, the message verification process improves the user experience. For example, intercepting fraudulent or spam message prevents users from being exposed to potentially fraudulent content, thereby improving the security and trustworthiness of the system from both the system and the user perspective.

Figure 1:
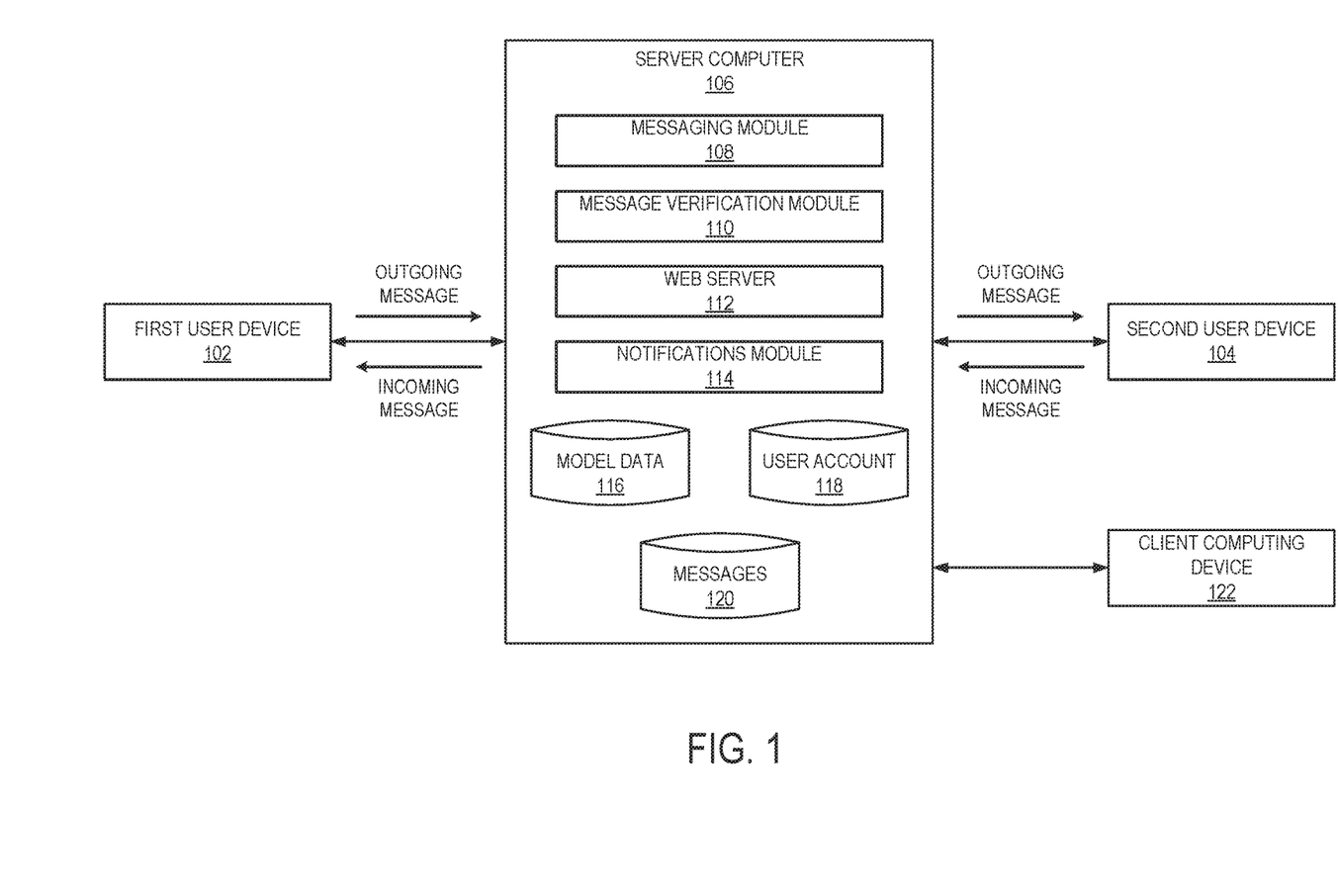
FIG. 1 illustrates an exemplary system according to some embodiments described herein.

FIG. 1 illustrates an exemplary network architecture that uses embodiments described herein. The system illustrated in FIG. 1 includes a first user device 102, a second user device 104, a server computer 106, and a client computing device 122. In one embodiment, the server computer 106 is situated between user devices 102 and 104 and is configured to communicate with user devices 102 and 104, as well as facilitate communications between user devices 102 and 104. Exemplary user devices 102 and 104 include conventional computer systems, such as a desktop computer or laptop computer, or may include devices having computer functionalities such as Personal Digital Assistants (PDA), tablet computers, cellular or mobile telephones, smartphones, or other electronic devices programmed to implement one or more embodiments set forth herein.

User devices 102 and 104 are configured to interact with the server computer 106 and can be any type of computing device capable of receiving user input as well as transmitting and/or receiving data via a network or a collection of networks—such as the Internet, a corporate Intranet, a Virtual Private Network (VPN), a Local Area Network (LAN), a Wireless Local Area Network (WLAN), a cellular network, a Wide Area Network (WAN), a Metropolitan Area Network (MAN), or a combination of two or more such networks. The network may be wired, wireless, or a combination of both. In one embodiment, the network uses standard communications technologies and/or protocols.

The embodiment of the server computer 106 illustrated in FIG. 1 includes messaging module 108, message verification module 110, web server 112, and notifications module 114. This embodiment also includes model data database 116, user account database 118, and messages database 120. Other embodiments may include fewer or additional modules and databases than those depicted in FIG. 1.

The messaging module 108 is configured to receive or detect interactions (e.g., messages) sent between user devices 102 and 104. In some embodiments, the messaging module 108 receives voice-based messages and/or text-based messages. For example, messages can be in the form of email messages, text messages, voice messages, etc. In some embodiments, the messaging module 108 intercepts messages sent between user devices 102 and 104. In other embodiments, messages are sent through the server computer 106 and received by the messaging module 108.

The message verification module 110 is configured to perform a verification process on the messages received by the messaging module 108 from one of user devices 102 and 104 for sending to the other of user device 102 and 104. In some embodiments, the message verification module 110 performs the verification process on a message prior to transmitting the message to the destination. In other embodiments, the message verification module 110 performs the verification process on a message after, or in parallel, to transmitting the message to the destination. In embodiments where the verification process is performed after or in parallel to transmitting the message, the message can be recalled or deleted in response to the verification process determining that the message is fraudulent or spam. In some embodiments, the verification process includes performing one or more binary checks on the message. In some embodiments, the message verification module 110 analyzes the message, identifies keywords within the message, applies the identified keywords to a predictive model, and generates a likelihood value representing a probability of the message being a legitimate message.

In some embodiments, the result of the verification process on a message produces one of two results: legitimate (e.g., not spam) and non-legitimate (e.g., spam). In some embodiments, the messages may be flagged by the system with the appropriate designation indicating the result of the verification process, and then can be processed by the messaging module 108 based on the flag. In some embodiments, messages that are marked as legitimate can proceed normally to the intended destination of the message. In some embodiments, message that are marked as being non-legitimate may be prevented from being transmitted to the intended destination. In some embodiments, messages marked as being non-legitimate are stored in the messages database 120. In other embodiments, messages marked as being non-legitimate are deleted.

In other embodiments, the result of the verification process on a message may produce an additional result: indeterminate. In some embodiments, messages marked as indeterminate can be sent for further analysis. For example, the messages marked as indeterminate can be sent to the client computing device 122 to perform a manual review.

In one embodiment, each of user devices 102 and 104 executes a network application that is capable of transmitting and/or receiving network traffic. For example, the network application may be a web browser or other application that can access network resources (e.g., web pages, images, word processing documents, PDF files, movie files, music files, or other computer files) using the network application. The web server 112 links the server computer 106 to one or more user devices 102 and 104 (e.g., via a network) by accepting requests (e.g., messages) from user devices 102 and 104 and/or transmitting web pages or other web-related content to user devices 102 and 104, such as image files, audio files, video files, Java applets, Flash, XML, JavaScript, Cascading Style Sheets (CSS), etc. In some embodiments, web server 112 is configured to utilize a set of one or more network interfaces to send and receive messages across a network.

In some embodiments, the web server 112 (additionally or alternately) utilizes messaging module 108 to send and/or receive interactions (e.g., messages) to user devices 102 and 104 or between user devices 102 and 104. In some embodiments, the messaging module 108 is operative to send and/or receive instant messages, queued messages (e.g., email), text and SMS (Short Message Service) messages, voice messages, or utilize any other suitable messaging technique.

The notifications module 114 is configured to generate notification messages indicating the result of the verification process performed by the message verification module 110.

The notification messages can be generated for internal use by the message verification module 110, or can be sent to the intended destination (e.g., the second user device 104). For example, the notification message can be sent to inform the second user associated with the second user device 104 that the server computer 106 handled a message that was determined to be a non-legitimate message. The notification message can also inform the second user associated with the second user device 104 that corrective actions were taken with respect to a user account of the second user in response to the determination that the message was a non-legitimate message.

The model data database 116 stores data used by the predictive model. The predictive model uses the data to determine whether the messages received by the server computer 106 are legitimate message or non-legitimate messages. In some embodiments, the model data database 116 stores a list of blacklisted phrases or keywords. For example, blacklisted phrases or keywords can indicate that the message includes one or more of a payment scam, profanity, soliciting sex, have low intent to hire, is in a non-supported language, is looking for free services, and/or is from a minor, among other things. The blacklisted phrases or keywords can be pre-established within the system or can be learned by the system based on a history of previous messages analyzed.

The user account database 118 stores account data for users of the system. In some embodiments, the account data includes user information, include contact information, payment information (e.g., payment account information), professional services offered, and previous bids provided by users.

The messages database 120 stores a history of previous messages sent through the server computer 106, including an indication of whether each of the messages was determined to be a legitimate message or a non-legitimate message. In some embodiments, the history of previous messages in the messages database 120 is used by the message verification module 110 with data stored in the model data database 116 to refine the predictive model used to determine whether a message is legitimate or not legitimate.

Exemplary client computing device 122 includes conventional computer systems, such as a desktop computer or laptop computer, or may include devices having computer functionalities such as Personal Digital Assistants (PDA), tablet computers, cellular or mobile telephones, smartphones, or other electronic devices programmed to implement one or more embodiments set forth herein.

Figure 2:
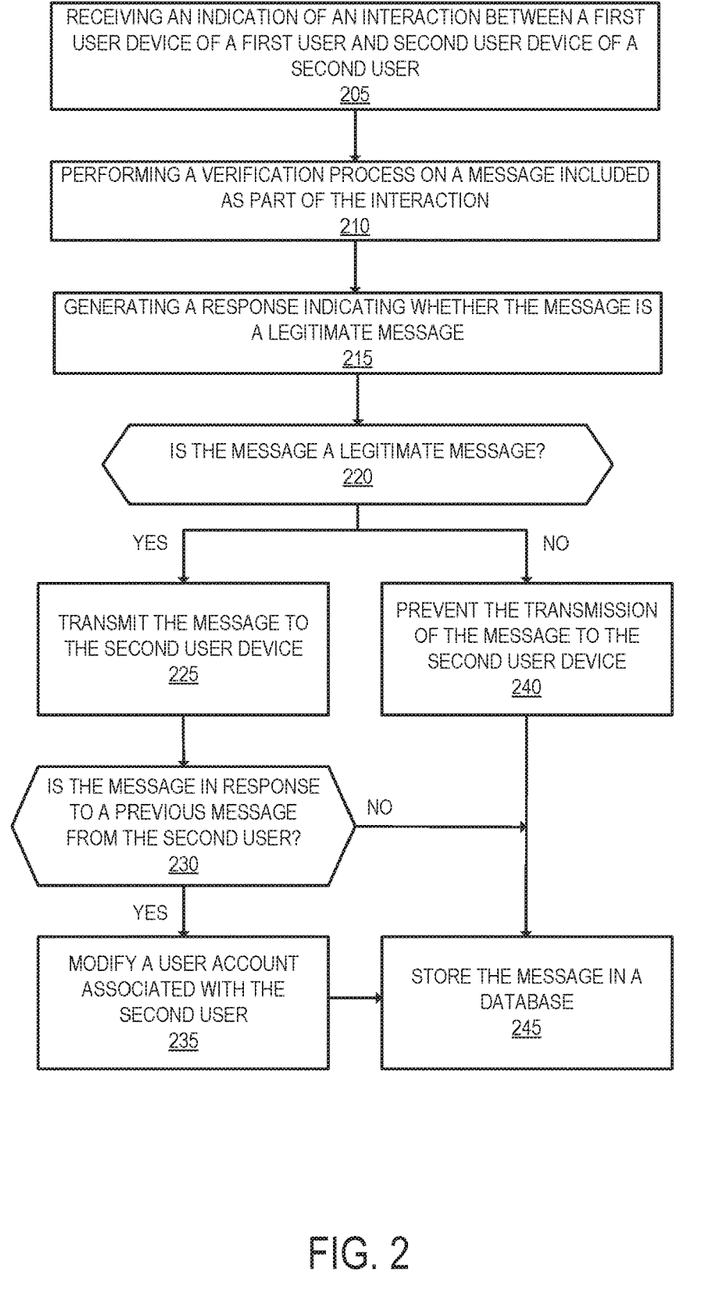
FIG. 2 is a flow diagram that illustrates exemplary operations for performing message verification, according to an embodiment.

FIG. 2 is a flow diagram that illustrates exemplary operations for performing message verification according to an embodiment. The operations of FIG. 2 will be described with reference to the exemplary embodiment of FIG. 1. However, it should be understood that the operations of FIG. 2 can be performed by embodiments of the invention other than those discussed with reference to FIG. 1, and the embodiments discussed with reference to FIG. 1 can perform operations different than those discussed with reference to FIG. 2.

At operation 205, the server computer 106 receives an indication of an interaction between a first user device 102 of a first user and a second user device 104 of a second user. In the example described herein, the interaction includes a message for transmission from the first user device 102 to the second user device 104. In other situations, the interaction includes a message for transmission from the second user device 104 to the first user device 102. In some embodiments, the message may be a response message from the second user device 104 sent in reply to an initial request message sent by the first user device 102 to the server computer 106 and retrieved by the second user device. For example, message may be a request message from the first user device 102 requesting a service to be performed, and the message may be a response message from the second user device 104 that includes a proposal related to the service request. In some embodiments, the message may be an additional response message sent from the first user device 102 to the second user device 104 in response to the response message from the second user device 104. For example, the message may be a response message sent from the first user device 102 to the second user device 104 responding to the response message from the second user device 104 that included the proposal related to the service request.

In some embodiments, the server computer 106 receives the indication of the interaction between the first user device 102 and the second user device 104 when the server computer 106 receives the message from the first user device 102. In some embodiments, the message is received over a network from the first user device 102. In some embodiments, the server computer 106 stores the received interaction (e.g., message) in a messages database 120.

In some embodiments, the server computer 106 receives the indication of the interaction between the first user device and the second user device 104 when the interaction is performed using an interface provided by the server computer 106. For example, the server computer 106 may be associated with a website or an application that facilitates the interactions. In other embodiments, the server computer 106 receives the indication of the interaction when the interaction is performed using a communication means linked to the server computer 106. For example, the server computer 106 may provide a unique contact method (e.g., phone number, email address, meeting scheduling software), where the unique contact method can be tracked by the server computer 106 to identify when an interaction has occurred.

Next, the flow proceeds to operation 210, where a message verification module 110 performs a verification process on the message included as part of the interaction between the first user device 102 and the second user device 104. In some embodiments, as part of the verification process, the message verification module 110 accesses the model data database 116. In some embodiments, the model data database 116 includes blacklisted keywords and/or phrases and the type of non-legitimate messages the blacklisted keywords and/or phrases correspond to. In some embodiments, the model data database 116 includes user-inputted or machine-learned rules or content that are indicative of fraud, or are otherwise non-legitimate, as well as rules or content that are indicative of legitimate communications. Examples of content indicative of a non-legitimate message include, but are not limited to the following:

| Types of Non-Legitimate Messages | Examples |
| --- | --- |
| Banned User | Message sent from blacklisted email address, phone number, or other contact means |
| | Message sent from a banned user |
| Profanity | Message contains profanity or inappropriate language |
| Payment Scam | Message contains poor grammar |
| | Immediately discusses payment. |
| | Very little discussion of the job details. |

-continued

| Types of Non-Legitimate Messages | Examples |
|---|---|
| | Message asks if user will accept credit cards or cashier checks |
| | Message mentions health problems (e.g., recovering from cancer, heart problem, hearing impaired) |
| | Message indicates urgency (e.g., "urgent", "ASAP", "right now") |
| | User tries to take message off of the provided platform. |
| | Message contains contact information not associated with the user account (e.g., different email address or phone number) |
| Inappropriate Solicitation | User is trying to hire user for competing business Mention their own business and benefits working for them |
| | Message includes requests for inappropriate services from the user |
| Messages from Minors | User is a minor (under 18 years of age) Message includes content indicating the user is a minor (e.g., "high school", "prom", describes kid activities) |
| Messages in Unsupported Languages | Message contains content in languages that are not supported by the system |
| Bartering/Seeking Free Services | Users looking for users who will do the work for free for a charity/non-profit (e.g., "donate", "free", "charity") |
| Garbled Messages | Message does not make sense |
| Low/No Intent to Hire | Messages contain words indicating the user is not interested in proposal received from another user (e.g., "not interested", "no, thank you") |

In some embodiments, the message verification module 110 may also perform one or more binary checks on the message. In such embodiments, the message verification module 110 compares the identified keywords to information stored in the model data database 116. In such embodiments, the message verification module 110 can determine if one or more of the identified keywords is a blacklisted keyword. For example, the message verification module 110 can mark messages from banned users, banned emails, or banned phone numbers, as being non-legitimate. In another example, the message verification module 110 can mark messages containing profanity, inappropriate solicitation, and/or indicating low or no intent to hire, as non-legitimate. In another example, the message verification module 110 determines if the message is associated with a valid name or user name. In some embodiments, determining if the name or user name is valid is based on a history of previous messages processed by the server computer 106 and/or using third party data (e.g., census data).

In some scenarios, the result of the verification process performed by the message verification module 110 may be indeterminate. In such situations, the message may be sent to a manual review process. In some embodiments, the messaging module 108 transmits the message to a client computing device 122, and the result of the manual review can be sent back to the server computer 106 by the client computing device 122. In other embodiments, the server computer 106, by default, marks the message as non-legitimate when the message verification module 110 cannot determine its legitimacy. In other embodiments, the default rule is to mark the message as a legitimate message and process the message similarly to messages determined to be legitimate messages.

In some embodiments, the message verification module 110 generates a result of the verification process automatically and distributes the result. In other embodiments, after the message verification module 110 generates the rule, the result is further processed through a client computing device 122 for a manual review.

In the embodiment depicted in FIG. 2, the message verification module 110 is executed by the server computer 106. In other embodiments, the message verification module 110 is executed by another computer separate from the server computer (e.g., client computing device 122).

At operation 215, based on the result of the message verification process, server computer 106 generates a response indicating whether the message is a legitimate message. For example, when the generated likelihood value is at or above an established threshold, the message can be determined to be legitimate. In contrast, when the generated likelihood value is below an established threshold, the message can be determined to be non-legitimate. In some embodiments, the server computer 106 flags the message as being legitimate or non-legitimate. In some embodiments, the response indicating whether the message is a legitimate message or a non-legitimate message is generated by the notifications module 114.

At operation 220, when the message is determined to be a legitimate message, the flow proceeds to operation 225. When the message is determined to be a non-legitimate message, the flow proceeds to operation 245.

At operation 225, in response to the server computer 106 determining that the message is a legitimate message, the messaging module 108 transmits the message to its destination (e.g., the second user device 104). In some embodiments, the messaging module 108 transmits the message to the second user device 104 using an appropriate communication means, such as over a communications network. In some embodiments, the message is transmitted to the second user device 104 without any alteration to the message as initially sent by the first user device 102. In other embodiments, the message is transmitted to the second user device 104 with an indication that the message was verified by the server computer 106 as a legitimate message prior to the message being sent to the second user device 104.

In some embodiments, the messaging module 108 transmits the message to the second user device 104 by displaying the message on a user interface associated with the server computer 106. For example, the message may be transmitted for display on a website or application associated with the server computer 106. In other embodiments, the messaging module 108 transmits the message display within a messaging application (e.g., an email or text message application) stored on the second user device 104.

At operation 230, the server computer 106 determines if the message was sent in response to a previous message. In some embodiments, the server computer 106 may distinguish between various types of messages, including, but not limited to: (1) a request message made by a first user, (2) a message sent from a second user to the first user in response to the request message, and (3) a response message from the first user in response to the message sent from the second user to the first user. In some embodiments, different types of messages trigger different operations to be performed by server computer 106.

When the message is a response message from the first user in response to the message sent from the second user to the first user (e.g., type 3), the flow proceeds to operation 235. For example, the message may be a response message from the first user responding to a previous message sent from the second user to the first user, where the previous message from the second user included the proposal related to the initial request made by the first user. When the message is a request message (e.g., type 1) or a message sent in response to a request message (e.g., type 2), the flow proceeds to operation 245.

At operation 235, the server computer 106 modifies a user account of the second user associated with the second user device 104. In some embodiments, the server computer 106 accesses the user account database 118 to retrieve the user account data associated with the user account of the second user. In some embodiments, the server computer 106 modifies the user account of the second user. For example, because the first user responded to the second user's response message, and the message was verified as a legitimate message by the message verification module 110, the server computer 106 may post a charge to the user account of the second user.

At operation 240, in response to the server computer 106 determining that the message is a non-legitimate message, the messaging module 108 prevents the message from being transmitted to its intended destination (e.g., the second user device 104). In some embodiments, where the message was sent from a user device associated with a user account, the server computer 106 accesses the user account database 118 to flag the user account that sent the message to indicate that a non-legitimate message was sent from the user account. In some embodiments, the notifications module 114 generates a notification to send to the second user device 104 indicating that the first user attempted to send a non-legitimate message to the second user device 104 of the second user.

At operation 245, the server computer 106 stores the message in a messages database 120. In some embodiments, the message is stored in the messages database 120 when the message is determined to be legitimate and/or when the message is determined to be non-legitimate. In some embodiments, the messages stored in the messages database 120 can be used by the message verification module 110 to refine the predictive model used to determine whether subsequent messages received by the server computer 106 are legitimate or non-legitimate.

In the embodiment described with respect to FIG. 2, the message verification process is applied to the message prior to the message being sent to its destination (e.g., the second user device 104). In an alternative embodiment, the message is sent by the server computer 106 to the second user device 104 prior to, or concurrently with, the message verification module 110 performing the verification process on the message. In such an embodiment, assuming the message from the first user device 102 was determined to be a response to a response message from the second user device 104, the user account associated with the second user is potentially modified by the server computer 106, as described with respect to operation 235 in FIG. 2, prior to determining whether the message was a legitimate message or a non-legitimate message. In such a situation, in the event the message verification module 110 determines that the message was a non-legitimate message, the server computer 106 performs corrective measures on the user account of the second user. For example, the server computer 106 may modify the user account of the second user to credit back a charge that was applied to the user account of the second user. The notifications module 114 may also generate a notification message indicating that a previous message was determined to be a non-legitimate message and a credit has been posted to the user account of the second user. The notification message can then be transmitted to the second user device 104 by the messaging module 108. In addition, in response to the message being determined to be non-legitimate, the server computer 106 can automatically delete, or otherwise remove, the message from the account of the second user.

In the event the message verification module 110 determines that the message was a legitimate message, the server computer 106 does not need to take additional action, as the user account of the second user has already been modified.

Figure 3:
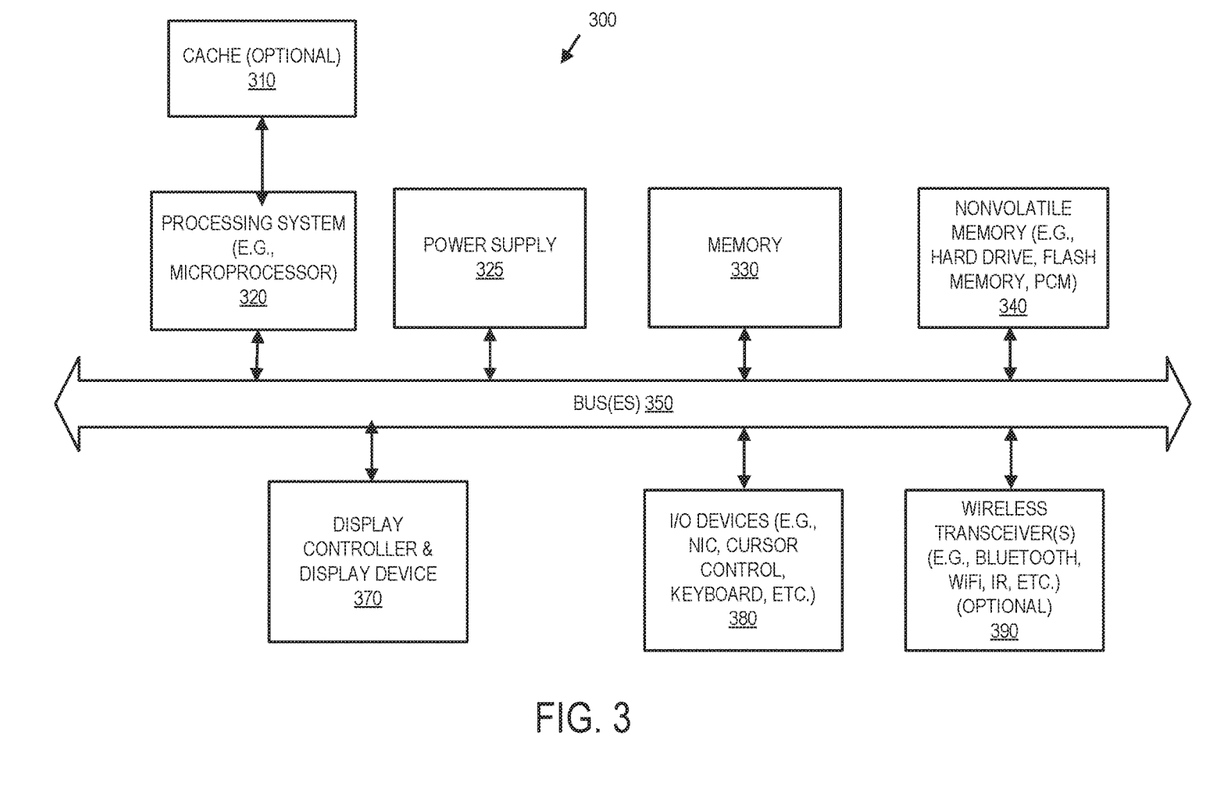
FIG. 3 is a block diagram illustrating a data processing system that can be used in an embodiment.

As illustrated in FIG. 3, the computer system 300, which is a form of a data processing system, includes the bus(es) 350 which is coupled with the processing system 320, power supply 325, memory 330, and the nonvolatile memory 340 (e.g., a hard drive, flash memory, Phase-Change Memory (PCM), etc.). The bus(es) 350 may be connected to each other through various bridges, controllers, and/or adapters as is well known in the art. The processing system 320 may retrieve instruction(s) from the memory 330 and/or the nonvolatile memory 340, and execute the instructions to perform operations described herein. The bus 350 interconnects the above components together and also interconnects those components to the display controller & display device 370, input/output devices 380 (e.g., NIC (Network Interface Card), a cursor control (e.g., mouse, touchscreen, touchpad, etc.), a keyboard, etc.), and the optional wireless transceiver(s) 390 (e.g., Bluetooth, Wi-Fi, Infrared, etc.). In one embodiment, the client device, caching system, and/or service device described herein may take the form of the computer system 300.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A computer-implemented method comprising:
receiving a first indication of a first interaction between a first user device of a first user and a second user device of a second user, the first interaction including a first message for transmission from the first user device to the second user device;
performing, by a message verification system, a verification process on the first message, the verification process on the first message including:
identifying keywords in voice content or text content of the first message,
applying the keywords to a predictive model, and
generating a likelihood value representing a probability of the first message being legitimate based on the application of the keywords to the predictive model;
generating a first response indicating that the first message is a legitimate message based on the verification process;
responsive to the first response indicating that the first message is legitimate, performing the following:
transmitting the first message to the second user device of the second user for display on the second user device, and
determining that the first message is a response message to a previous message sent from the second user device to the first user device, and responsive to this determination, modifying a user account associated with the second user including posting a charge to the user account;
receiving a second indication of a second interaction between a third user device of a third user and a fourth user device of a fourth user, the second interaction including a second message for transmission from the third user device to the fourth user device;
performing, by the message verification system, the verification process on the second message;
generating a second response indicating that the second message is not a legitimate message based on the verification process; and
responsive to the second response indicating that the second message is non-legitimate, preventing the transmission of the second message to the fourth user device.

2. The computer-implemented method of claim 1, wherein the verification process includes performing one or more binary checks on the first message, and wherein the one or more binary checks include:
comparing the keywords to information stored in a database; and
determining that one or more of the keywords is a blacklisted keyword.

3. The computer-implemented method of claim 1, wherein the predictive model is based on a history of previous legitimate messages and non-legitimate messages determined by the message verification system.

4. The computer-implemented method of claim 1, further comprising:
receiving a third indication of a third interaction between the first user device and the second user device, the third interaction including a third message for transmission from the first user device to the second user device;
transmitting the third message to the second user device;
modifying the user account associated with the second user;
performing the verification process on the third message; and
in response to determining that the third message is a non-legitimate message, performing corrective measures on the user account associated with the second user, the corrective measures including an additional modification to the user account associated with the second user.

5. A non-transitory machine-readable storage medium that provides instructions that, when executed by a processor, cause said processor to perform operations comprising:
receiving a first indication of a first interaction between a first user device of a first user and a second user device of a second user, the first interaction including a first message for transmission from the first user device to the second user device;
performing, by a message verification system, a verification process on the first message, the verification process on the first message including:
identifying keywords in voice content or text content of the first message,
applying the keywords to a predictive model, and
generating a likelihood value representing a probability of the first message being legitimate based on the application of the keywords to the predictive model;
generating a first response indicating that the first message is a legitimate message based on the verification process;
responsive to the first response indicating that the first message is legitimate, performing the following:
transmitting the first message to the second user device of the second user for display on the second user device, and
determining that the first message is a response message to a previous message sent from the second user device to the first user device, and responsive to this determination, modifying a user account associated with the second user including posting a charge to the user account;
receiving a second indication of a second interaction between a third user device of a third user and a fourth user device of a fourth user, the second interaction including a second message for transmission from the third user device to the fourth user device;
performing, by the message verification system, the verification process on the second message;
generating a second response indicating that the second message is not a legitimate message based on the verification process; and
responsive to the second response indicating that the second message is non-legitimate, preventing the transmission of the second message to the fourth user device.

6. The non-transitory machine-readable storage medium of claim 5, wherein the verification process includes performing one or more binary checks on the first message, and wherein the one or more binary checks include:
comparing the keywords to information stored in a database; and
determining that one or more of the keywords is a blacklisted keyword.

7. The non-transitory machine-readable storage medium of claim 5, wherein the predictive model is based on a history of previous legitimate messages and non-legitimate messages determined by the message verification system.

8. The non-transitory machine-readable storage medium of claim 5, further comprising:

receiving a third indication of a third interaction between the first user device and the second user device, the third interaction including a third message for transmission from the first user device to the second user device;

transmitting the third message to the second user device;

modifying the user account associated with the second user;

performing the verification process on the third message; and in response to determining that the third message is a non-legitimate message, performing corrective measures on the user account associated with the second user, the corrective measures including an additional modification to the user account associated with the second user.

9. An apparatus, comprising:

a processor; and a non-transitory machine-readable storage medium coupled with the processor that stores instructions that, when executed by the processor, cause said processor to perform the following:

receive a first indication of a first interaction between a first user device of a first user and a second user device of a second user, the first interaction including a first message for transmission from the first user device to the second user device;

perform, by a message verification system, a verification process on the first message, wherein the verification process on the first message further causes said processor to:

identify keywords in voice content or text content of the first message, apply the keywords to a predictive model, and generate a likelihood value representing a probability of the first message being legitimate based on the application of the keywords to the predictive model;

generate a first response indicating that the first message is a legitimate message based on the verification process;

responsive to the first response indicating that the first message is legitimate, performing the following:

transmit the first message to the second user device of the second user for display on the second user device, and determine that the first message is a response message to a previous message sent from the second user device to the first user device, and responsive to this determination, modify a user account associated with the second user including posting a charge to the user account receive a second indication of a second interaction between a third user device of a third user and a fourth user device of a fourth user, the second interaction including a second message for transmission from the third user device to the fourth user device;

perform, by the message verification system, the verification process on the second message;

generate a second response indicating that the second message is not a legitimate message based on the verification process; and responsive to the second response indicating that the second message is non-legitimate, prevent the transmission of the second message to the fourth user device.

10. The apparatus of claim 9, wherein the verification process includes performing one or more binary checks on the first message, and wherein the one or more binary checks include:

comparing the keywords to information stored in a database; and determining that one or more of the keywords is a blacklisted keyword.

11. The apparatus of claim 9, wherein the predictive model is based on a history of previous legitimate messages and non-legitimate messages determined by the message verification system.

12. The apparatus of claim 9, wherein the instructions further cause said processor to perform the following:

receive a third indication of a third interaction between the first user device and the second user device, the third interaction including a third message for transmission from the first user device to the second user device;

transmit the third message to the second user device;

modify the user account associated with the second user;

perform the verification process on the third message; and in response to determining that the third message is a non-legitimate message, perform corrective measures on the user account associated with the second user, the corrective measures including an additional modification to the user account associated with the second user.

* * * * *